US012587969B2

(12) United States Patent
Kim et al.

(10) Patent No.: US 12,587,969 B2
(45) Date of Patent: Mar. 24, 2026

(54) APPARATUS AND METHOD FOR REDUCING POWER CONSUMPTION IN WIRELESS COMMUNICATION

(71) Applicant: SAMSUNG ELECTRONICS CO., LTD., Suwon-si (KR)

(72) Inventors: Anna Kim, Suwon-si (KR); Kiho Kil, Suwon-si (KR); Kwonyeol Park, Suwon-si (KR); Wonseok Jeong, Suwon-si (KR); Ilmuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 600 days.

(21) Appl. No.: 18/054,571

(22) Filed: Nov. 11, 2022

(65) Prior Publication Data

US 2023/0141784 A1     May 11, 2023

(30) Foreign Application Priority Data

Nov. 11, 2021     (KR) ......................... 10-2021-0155160
May 9, 2022     (KR) ......................... 10-2022-0056884

(51) Int. Cl.
*H04W 52/26*          (2009.01)
*H04W 52/36*          (2009.01)

(52) U.S. Cl.
CPC ......... *H04W 52/26* (2013.01); *H04W 52/365* (2013.01); *H04W 52/367* (2013.01)

(58) Field of Classification Search
CPC . H04W 52/146; H04W 52/26; H04W 52/346; H04W 52/36; H04W 52/365; H04W 52/367; Y02D 30/70
See application file for complete search history.

(56) References Cited

U.S. PATENT DOCUMENTS 7,860,018 B2    12/2010 Raith
8,200,174 B2    6/2012 Chao et al.
(Continued)

FOREIGN PATENT DOCUMENTS

JP          5559236          7/2014
KR    10-2013-0007737          1/2013
KR        10-1289039          7/2013

OTHER PUBLICATIONS

5G; NR; "Physical layer procedures for control (3GPP TS 38.213 version 15.6.0 Release 15)", ETSI TS 138 213 15.6.0 (Jul. 2019), 110 pages.

*Primary Examiner* — Timothy X Pham
(74) *Attorney, Agent, or Firm* — Morgan, Lewis & Bockius LLP

(57)     ABSTRACT

The devices, systems, and techniques described herein provide for efficient communications between devices to reduce power consumption while maintaining performance. In some aspects, a terminal may adjust a transmission power limit for transmitting signals to a base station to reduce power consumption at the terminal. In some examples, the terminal may adjust the transmission power limit based on a temperature of the terminal and a number of resource blocks allocated to the terminal (e.g., such that the temperature remains below a threshold). In some other examples, the terminal may adjust the transmission power limit based on a block error rate (BLER) (e.g., such that the BLER remains below a threshold while minimizing the transmission power limit). In some other examples, the terminal may adjust the transmission power limit based on an importance of one or more transmissions (e.g., to avoid wasting power on less important transmissions).

11 Claims, 14 Drawing Sheets

(56)  References Cited

U.S. PATENT DOCUMENTS

| | | | |
|---|---|---|---|
| 9,047,067 B2 | 6/2015 | Anderson et al. | |
| 9,084,201 B2 | 7/2015 | Athalye et al. | |
| 9,113,474 B2 | 8/2015 | Kim | |
| 9,667,280 B2 | 5/2017 | Shahidi et al. | |
| 10,284,177 B2 | 5/2019 | Caron et al. | |
| 10,334,520 B2 | 6/2019 | Wang et al. | |
| 2013/0017851 A1* | 1/2013 | Kim | H04W 72/51 |
| | | | 340/584 |
| 2017/0265141 A1* | 9/2017 | Yang | G06F 1/329 |
| 2018/0139702 A1* | 5/2018 | Ramkumar | H04W 52/34 |
| 2019/0069246 A1* | 2/2019 | Pintado | H04W 52/0261 |
| 2020/0351791 A1* | 11/2020 | Stauffer | H04W 76/27 |

* cited by examiner

Radio frame (214)

Subframe (205)

Slot (206)

Resource element
(212)

Resource block
(208)

$N_{BW}$ subcarriers (204)

$N_{RB}$ subcarriers (210)

N symb OFDM symbols
(202)

FREQUENCY

TIME

500

START

OBTAIN TEMPERATURE OF TERMINAL — S110

RECEIVE RESOURCE BLOCK ALLOCATION INFORMATION FROM BASE STATION — S120

ADJUST TRANSMISSION POWER LIMIT BASED ON TEMPERATURE AND RESOURCE BLOCK ALLOCATION INFORMATION — S130

TRANSMIT FIRST SIGNAL TO BASE STATION BASED ON RESOURCE BLOCK ALLOCATION INFORMATION AND ADJUSTED TRANSMISSION POWER LIMIT — S140

END

Home Gadget

1220

Access Point

1211

Home Appliances

1212

Entertainment

1213

Vehicle

APPARATUS AND METHOD FOR REDUCING POWER CONSUMPTION IN WIRELESS COMMUNICATION

CROSS-REFERENCE TO RELATED APPLICATIONS

This application is based on and claims priority under 35 U.S.C. § 119 to Korean Patent Application Nos. 10-2021-0155160, filed on Nov. 11, 2021, and 10-2022-0056884, filed on May 9, 2022, in the Korean Intellectual Property Office, the disclosures of which are incorporated by reference herein in their entireties.

BACKGROUND

The present disclosure relates generally to wireless communications and, more particularly, to an apparatus and method for reducing power consumption in wireless communication systems.

A wireless communication system may include a number of devices (e.g., terminals, network devices, and other devices) exchanging data, control information, reference signals, etc. (e.g., communicating) with each other. In some examples, devices operating in a wireless communication system may employ various technologies to improve throughput or achieve a high data rate. These technologies may allow a wireless communication system to support communications between an increasing number of devices, support advanced functionalities at various devices, improve the quality of communications between devices, etc. Examples of technologies employed to improve throughput may include beamforming, massive multiple-input multiple-output (MIMO), full-dimensional MIMO (FD-MIMO), antenna arrays, analog beamforming, large-scale antenna technologies, etc.

Although a wireless communication system may experience improved throughput and high data rates when employing (e.g., implementing) such technologies, some technologies may be associated with high power consumption, increased computational complexity, etc. In other words, some technologies implemented to improve throughput may also result in increased power consumption by the device, which may limit functionality of some devices (e.g., such as of battery powered devices or other power constrained devices). For instance, inefficient power consumption at a terminal may unnecessarily reduce the battery life of the terminal (e.g., and thus may worsen user experience). Moreover, increased power consumption at a base station may increase capital expenses and/or other operating expenses of the wireless communication system. Accordingly, power efficient techniques and systems for increasing communication throughput in wireless communication systems may be desired.

SUMMARY

One or more aspects of the present disclosure describe apparatuses and methods for controlling heat generation and power consumption of a device. For example, one or more aspects described herein provide efficient techniques for controlling heat generation and power consumption of a device: when the device is configured to communicate over a wide bandwidth, when the device is configured to increase data processing speeds (e.g., to provide a low-latency or low-delay service), etc.

One or more aspects of the present disclosure provide a method of wireless communication by a terminal, including obtaining a temperature of the terminal, receiving resource block allocation information from a base station, adjusting a transmission power limit based on the temperature and the resource block allocation information, and transmitting a first signal to the base station on at least one resource block based on the resource block allocation information and the adjusted transmission power limit.

One or more aspects of the present disclosure provide a method of wireless communication by a terminal, including obtaining a temperature of the terminal, identifying a first number of resource blocks allocated by a base station, generating a report based on the temperature and the first number of allocated resource blocks, transmitting a first signal including the report to the base station, and receiving, based on the report, resource block allocation information from the base station allocating a second number of resource blocks to the terminal, wherein the second number of allocated resource blocks is less than the first number of allocated resource blocks based on the report.

One or more aspects of the present disclosure provide a terminal including a first processor configured to detect an overheating state based on a sensed temperature, a plurality of antennas, and a second processor connected to the plurality of antennas and configured to provide a plurality of transmission paths for a base station, wherein the second processor may be configured to change at least one first transmission path used for transmission for the base station to at least one second transmission path when the overheating state is detected.

One or more aspects of the present disclosure provide a method of wireless communication by a terminal, including transmitting one or more first signals to a base station in accordance with a first transmission power limit, obtaining a temperature of the terminal based on an amount of heat detected at the terminal, wherein the temperature of the terminal is based on the first transmission power limit, and transmitting one or more second signals to the base station in accordance with a second transmission power limit based on the temperature of the terminal, wherein the first transmission power limit is adjusted to the second transmission power limit based on the temperature of the terminal.

BRIEF DESCRIPTION OF THE DRAWINGS

One or more aspects of the present disclosure may be more clearly understood from the following detailed description taken in conjunction with the accompanying drawings.

FIG. 12 is a conceptual diagram illustrating an internet of things (IoT) network system applied to one or more aspects of the present disclosure.

DETAILED DESCRIPTION

Figure 1:
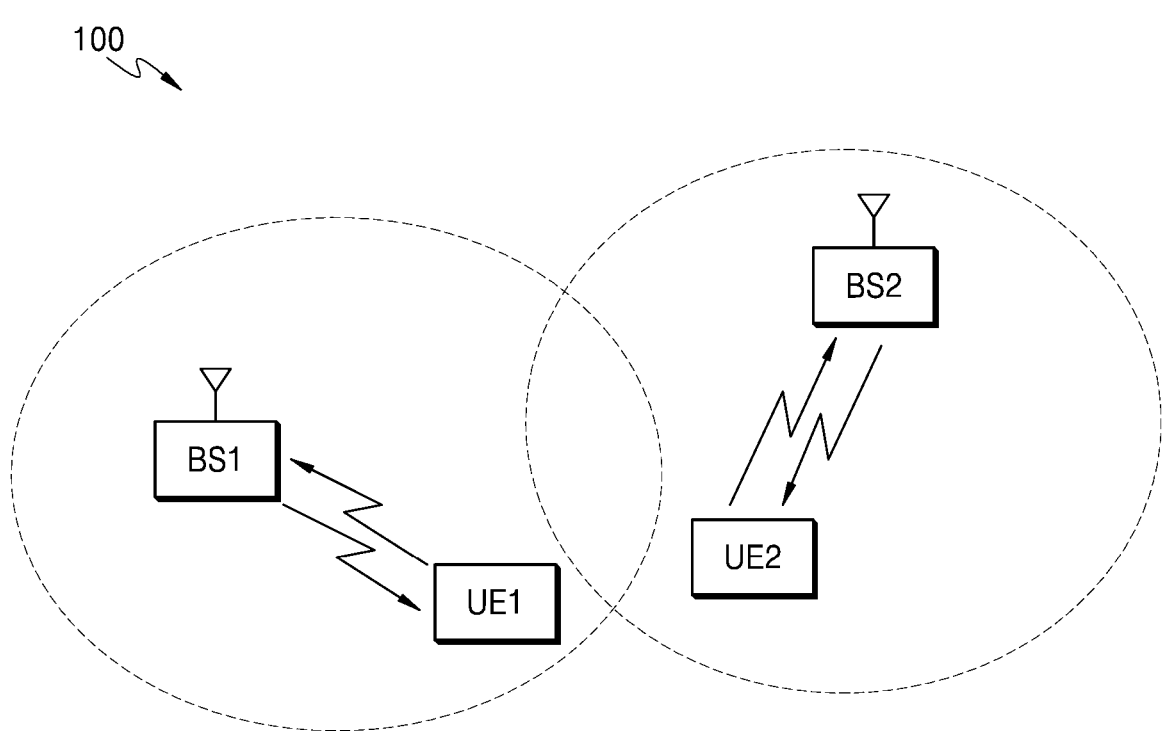
FIG. 1 is a block diagram illustrating a wireless communication system according to one or more aspects of the present disclosure.

A wireless communication system may generally include or refer to a number of devices employing techniques for exchanging information wirelessly. For instance, a wireless communication system may include terminals (e.g., user devices) and base stations (or network entities) that wirelessly communicate data, control information, reference signals, etc. (e.g., according to various wireless communication system implementations).

As a number of devices in a wireless communication system increases, an amount of data exchanged between the devices may increase, and it may be appropriate to increase a data rate to support communications between the devices. In addition, it may be appropriate to increase a data rate to support advanced applications and functionalities (e.g., machine learning) at one or more devices and to improve the quality of services (e.g., gaming services, virtual reality services, etc.) provided by a wireless communication system. Accordingly, a wireless communication system may support various technologies to increase a data rate.

However, technologies (or techniques) implemented to increase data rates (e.g., during wideband communication operations, during operations supporting low-latency services, etc.) may also be associated with increased power consumption and/or increased heat generation, which may adversely impact the performance of some wireless communication systems. For instance, inefficient power consumption by devices may degrade the performance of a wireless communication system, as power limited (e.g., battery powered) devices may inefficiently drain power (e.g., and may lose some functionality that would otherwise require more device power). Moreover, inefficient heat generation by devices may degrade the performance of a wireless communication system, as devices may generate too much heat (e.g., which may damage hardware components of the device, or which may trigger safety mechanisms that delay functionality, and thus further heat generation, to reduce potential hardware damage), etc.

The devices, systems, and techniques described herein provide for efficient communications between devices to reduce power consumption while maintaining performance in a wireless communication system. In some aspects, a terminal may adjust a transmission power limit for transmitting signals to a base station to reduce power consumption at the terminal. In some examples, the terminal may adjust the transmission power limit based on a temperature of the terminal and a number of resource blocks allocated to the terminal. Accordingly, the temperature of the terminal may not exceed (or may be unlikely to exceed) a threshold temperature, and the terminal may thus avoid using an excessive amount of power to transmit on a small number of resource blocks. In some examples, a terminal may adjust a transmission power limit based on a block error rate (BLER), such that the BLER remains below a threshold (e.g., while minimizing the transmission power limit). In some examples, a terminal may adjust a transmission power limit based on an importance (e.g., priority) of one or more transmissions (e.g., to avoid wasting power on less important transmissions).

FIG. 1 is a block diagram illustrating a wireless communication system 100 according to one or more aspects of the present disclosure. FIG. 1 may illustrate a wireless communication system 100 for describing one or more aspects of the present disclosure, but one or more aspects of the present disclosure may not be limited to being implemented in the wireless communication system 100. As shown in FIG. 1, the wireless communication system 100 may include first and second base stations BS1 and BS2 and first and second user equipments (UEs) UE1 and UE2.

Each of the first and second base stations BS1 and BS2 may generally refer to a fixed station communicating with a UE and/or another base station. In some examples, each of the first and second base stations BS1 and BS2 may exchange data and control information (e.g., communicate) with the first and second UEs UE1 and UE2 and/or another base station (not shown). In some examples, each of the base stations BS1 and BS2 may be referred to as a node B, an evolved-node B (eNB), a next generation node B (gNB), a sector, a site, a base transceiver system (BTS), an access point (AP), a relay node, a remote radio head (RRH), a radio unit (RU), a small cell, a device, etc. A base station or cell may cover one or more areas or functions covered by a base station controller (BSC) in code-division multiple access (CDMA), a node-B in wideband CDMA (WCDMA), an eNB in LTE, a gNB or a sector (site) of a Fifth-generation (5G) system, etc. A base station or cell may also cover various coverage areas such as a communication range covered by a mega-cell, macro-cell, micro-cell, pico-cell, femto-cell and relay nodes, remote radio head (RRH), radio unit (RU), small-cell, etc. In some examples (e.g., in some ORAN systems), the functions of a base station may be split between different network entities (e.g., a terminal may be communicating with multiple network entities (CUs, DUs, RUs) instead of a single base station, in some cases).

The first and second UEs UE1 and UE2 may be fixed or mobile and may communicate with any one of the first and second base stations BS1 and BS2. For instance, the first and second user equipments UE1 and UE2 may transmit data and/or control information to any one of the first and second base stations BS1 and BS2, and the first and second UEs UE1 and UE2 may receive data and/or control information from any one of the first and second base stations BS1 and BS2. In some examples, the first and second UEs UE1 and UE2 may be referred to as terminals, terminal equipments, mobile stations (MSs), mobile terminals (MTs), user terminals (Uts), subscriber stations (SSs), wireless communication devices, wireless devices, handheld devices, etc.

The first base station BS1 may provide wireless broadband access to the first UE UE1 in the coverage area of the first base station BS1. The second base station BS2 may provide wireless broadband access to the second UE UE2 in the coverage area of the second base station BS2. In an embodiment, the first and second base stations BS1 and BS2 may communicate with each other or with first and second UEs UE1 and UE2 using new radio (NR), LTE, LTE-advanced (LTE-A), WiMAX, WiFi, CDMA, global system for mobile telecommunications (GSM), wireless local area network (WLAN), or any other wireless communication techniques. One or more aspects of the present disclosure may be applied even when the first base station BS1 and the second base station BS2 use the same or different wireless communication technologies. One or more configurations and operations of the first base station BS1 and the first UE UE1 may be described for an NR network, but it will be fully understood that the present disclosure is not limited thereto. In addition, one or more aspects of the present disclosure may be applied to the second base station BS2 and the second UE UE2. In some examples, one or more aspects of the present disclosure may be defined as a 3GPP standard specification, and one or more aspects of the present disclosure may follow the 3GPP standard specification.

The first base station BS1 may perform uplink scheduling for the first UE UE1. The second base station BS2 may perform uplink scheduling for the second UE UE2. For example, the first base station BS1 may generate mapping information for an uplink resource for the first UE UE1 to use to transmit a first uplink signal (e.g., uplink control information, uplink data, etc.) to the first base station BS1. In some examples, the first UE UE1 may transmit uplink control information to the first base station BS1 on the uplink resource via a control channel (e.g., a physical uplink control channel (PUCCH)). For instance, the first UE UE1 may transmit, to the first base station BS1, a first uplink signal based on uplink scheduling. In some examples, data may be transmitted through a data channel such as a physical uplink shared channel (PUSCH), etc. The second UE UE2 may communicate with the second base station BS2 and may transmit a second uplink signal to the second base station BS2.

In addition, the first base station BS1 may perform downlink scheduling (e.g., allocate downlink resources) to the first UE UE1. The second base station BS2 may perform downlink scheduling for the second UE UE2. For example, the first base station BS1 may transmit control information through control channels such as a physical downlink control channel (PDCCH), a physical control format indicator channel (PCFICH), a physical hybrid automatic repeat request (HARQ) indicator channel (PHICH), an enhanced PDCCH or extended PDCCH (EPDCCH), etc., and the first base station BS1 may transmit data through a data channel such as a physical downlink shared channel (PDSCH), etc.

Figure 2:
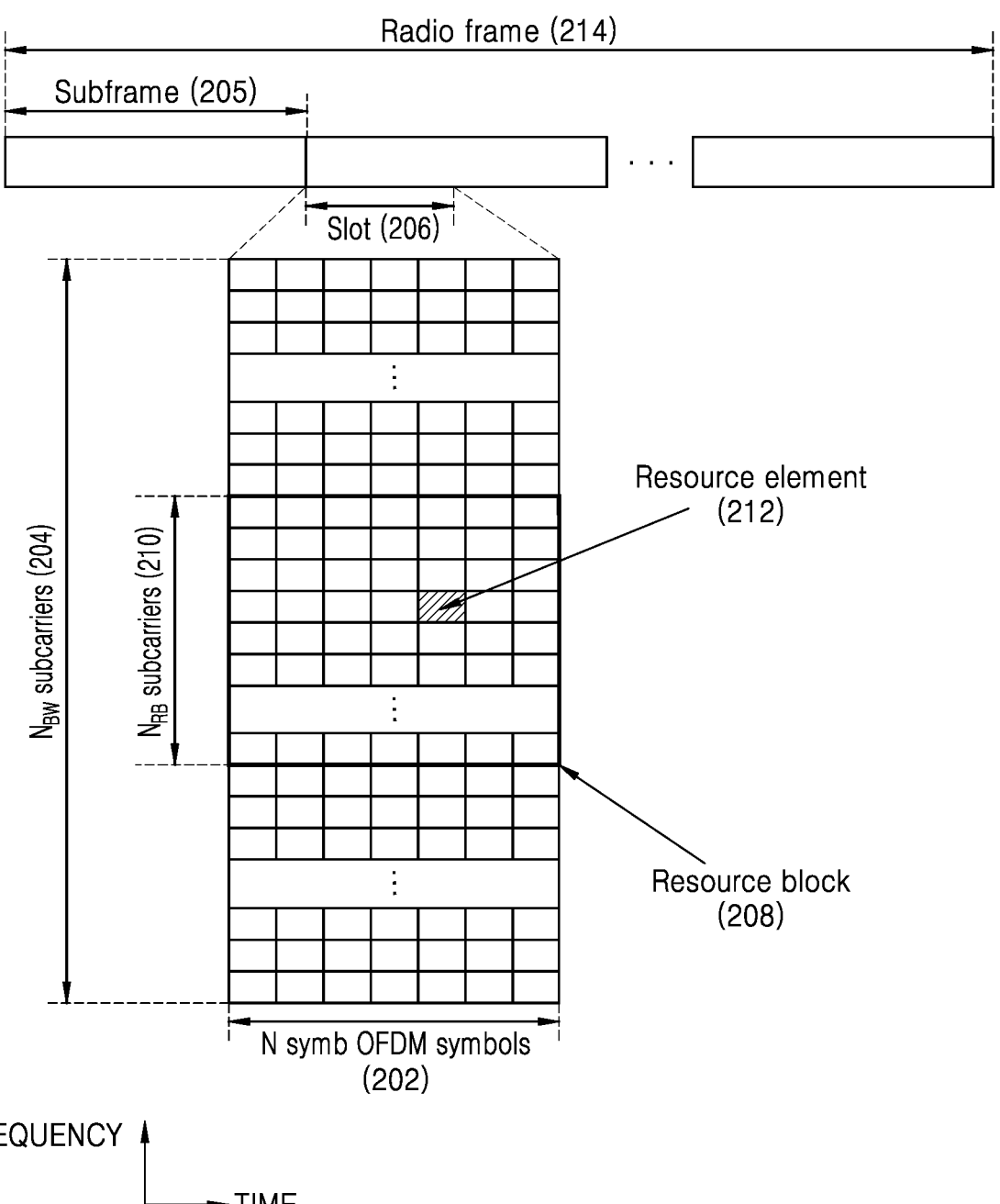
FIG. 2 is a diagram illustrating a structure of a time-frequency domain (e.g., a radio resource region) in a wireless communication system according to one or more aspects of the present disclosure.

FIG. 2 is a diagram illustrating a structure of a time-frequency domain (e.g., a radio resource region) in a wireless communication system according to one or more aspects of the present disclosure.

In FIG. 2, a horizontal axis may represent a time domain, and a vertical axis may represent a frequency domain. The minimum transmission unit in the time domain may be an orthogonal frequency division multiplexing (OFDM) or Discrete Fourier transform (DFT) spread OFDM (DFT-s-OFDM) symbol, and $N_{symb}$ OFDM or DFT-s-OFDM symbols 202 may form one slot 206. An OFDM symbol may be a symbol for transmitting and receiving signals using OFDM, and a DFT-s-OFDM symbol may be a symbol for transmitting and receiving signals using DFT-s-OFDM or single-carrier frequency-division multiple access (SC-FDMA). One or more aspects of the present disclosure may be described with reference to OFDM symbols without distinction of OFDM symbols and DFT-s-OFDM symbols.

In an embodiment, when the interval between subcarriers is 15 kHz, one slot may form one subframe 205, and the lengths of the slot and the subframe may be 1.0 ms. In this case, the number of slots constituting one subframe 205 and the length of the slots may vary according to the interval between subcarriers. For example, when the interval between subcarriers is 30 kHz, two slots may form one subframe 205. In this case, the length of the slot may be 0.5 ms, and the length of the subframe may be 1.0 ms. In an LTE network, one or more devices may be scheduled to communicate in one or more subframes (e.g., such as the subframe 205). In a 5G network, one or more devices may be scheduled to communicate in one or more slots (e.g., such as the slot 206). For instance, in the 5G network, a time-frequency domain may be defined around the slot 206. In addition, the radio frame 214 may be a time domain unit consisting of 10 subframes 205.

The minimum transmission unit in the frequency domain may be a subcarrier, and the bandwidth of the entire system transmission band may consist of a total of $N_{BW}$ subcarriers 204. In the time-frequency domain, the basic unit of a resource may be a resource element (RE) 212, which may be represented by an OFDM symbol index and a subcarrier index. A resource block (RB) 208 may be defined as $N_{symb}$ consecutive OFDM symbols 202 in a time domain and $N_{RB}$ consecutive subcarriers 210 in a frequency domain. Accordingly, one resource block 208 may be configured with ($N_{symb}*N_{RB}$) Res 212. The minimum allocation unit of the frequency domain of data may be the resource block 208. A resource block pair may consist of ($N_{symb}*2N_{RB}$) Res 212 in units in which two RBs are connected in a time axis. In some examples of a 5G network, $N_{symb}=14$, $N_{RB}=12$, and the number of resource elements 212 may vary according to the bandwidth of the 5G network transmission band. In some examples of an LTE network, $N_{symb}=7$, $N_{RB}=12$, and the number of resource elements 212 may vary according to the bandwidth of the LTE network transmission band.

In an embodiment, the uplink control information may be transmitted within the first N OFDM symbols in the subframe 205. In an example, N={1, 2, 3}, and the terminal may receive, from the base station, a set number of symbols on which uplink control information may be transmitted through an upper layer signal. In addition, depending on the amount of control information to be transmitted in the current slot 206, the base station may vary, for each slot 206, the number of symbols on which uplink control information may be transmitted in the slot 206, and the base station may transmit information on the number of symbols to the terminal through a separate uplink control channel.

Figure 3:
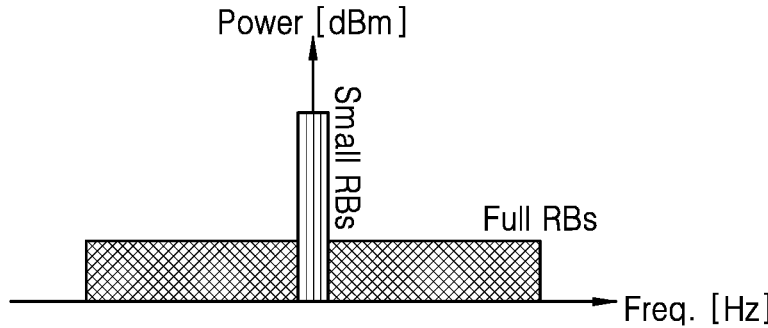
FIG. 3 is a graph illustrating transmission power in a frequency domain according to one or more aspects of the present disclosure.

FIG. 3 is a graph illustrating transmission power in a frequency domain according to one or more aspects of the present disclosure.

In FIG. 3, a horizontal axis may represent frequency, and a vertical axis may represent power. When the terminal transmits the uplink signal to the base station with the maximum transmission power, the strength of the transmission power in the frequency domain may vary according to the resource block allocation information (e.g., a resource block allocation) received from the base station. For example, the strength of a transmission power per carrier when the number of resource blocks allocated to the terminal is small, such as "Small RBs" of FIG. 3, may be higher than the strength of transmission power per carrier when the number of resource blocks allocated to the terminal is large, such as "Full RBs" of FIG. 3. Using the techniques described herein, when the number of resource blocks allocated to the terminal decreases, the terminal may increase a back-off from a transmission power limit. Thus, the terminal may avoid limiting performance to reduce a power consumption by increasing a back-off. Instead, the terminal may lower power consumption while maintaining performance of the terminal.

Figure 4:
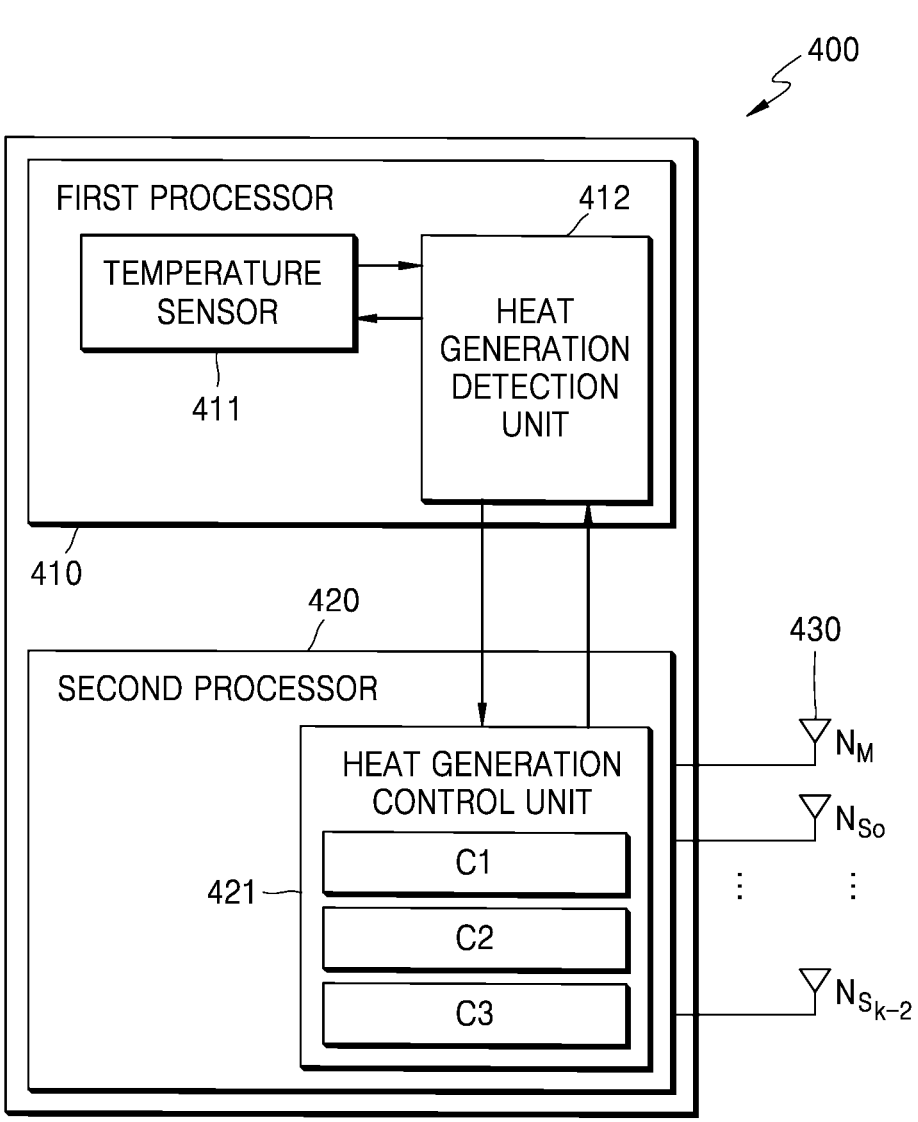
FIG. 4 is a block diagram illustrating a wireless communication terminal according to one or more aspects of the present disclosure.

FIG. 4 is a block diagram illustrating a wireless communication terminal according to one or more aspects of the present disclosure. In some embodiments, the wireless communication terminal 400 of FIG. 4 may be an example of the first UE UE1 of FIG. 1.

In FIG. 4, the wireless communication terminal 400 may include a first processor 410, a second processor 420, and a plurality of antennas 430. The first processor 410 and the second processor 420 may communicate with each other. In some embodiments, the first processor 410 may be an application processor (AP) and the second processor 420 may be a communication processor (CP). Each of the first processor 410 and the second processor 420 may have an arbitrary structure capable of processing a signal. For example, each of the first processor 410 and the second processor 420 may include a programmable component such as a central processing unit (CPU) or a digital signal processor (DSP), and a reconfigurable component such as a field programmable gate array (FPGA), etc., and/or a component providing a fixed function such as an intellectual property (IP) core, etc.

The first processor 410 may include a temperature sensor 411 and a heat generation detection unit 412. The temperature sensor 411 may measure the temperature of the wireless communication terminal 400 and may provide information on the measured temperature to the heat generation detection unit 412. The heat generation detection unit 412 may determine whether or not the wireless communication terminal 400 generates heat. For example, when the following Equation 1 is satisfied based on the current wireless communication terminal temperature received from the temperature sensor 411, the heat generation detection unit 412 may determine that there is heat generation.

$$T_{cur} > T_{th} \qquad \text{Equation 1}$$

In Equation 1, $T_{cur}$ may be a current temperature of the wireless communication terminal 400, and $T_{th}$ may be a threshold temperature.

The second processor 420 may include a heat generation control unit 421 and a plurality of antennas 430. The heat generation control unit 421 may control heat generation and power consumption of the wireless communication terminal 400. For example, the heat generation control unit 421 may receive a signal from the heat generation detection unit 412 indicating whether or not heat is generated, and the heat generation control unit 421 may receive a signal indicating a temperature measured by the temperature sensor 411. When the heat generation detection unit 412 detects heat generation based on Equation 1, and when the heat generation control unit 421 detects heat generation (e.g., based on receiving a signal from the heat generation detection unit 412 indicating that heat is generated), the heat generation control unit 421 may select at least one control method based on the current temperature of the wireless communication terminal 400, thereby controlling the heat generation and power consumption of the wireless communication terminal 400. For example, as shown in FIG. 4, the heat generation control unit 421 may select at least one of the first to third control schemes C1 to C3.

The plurality of antennas 430 may provide a plurality of transmission paths for the base station. A transmission path may refer to a transmission configuration (e.g., antenna orientations, range of beam weights, range of available antennas, etc.) used for transmitting signals to the base station. A transmission configuration may define a value for each of one or more parameters which may be used by a transmitter or a transmit chain to generate and transmit one or more signals to the base station. In an example, the heat generation control unit 421 may change at least one first transmission path used for transmission to the base station into at least one second transmission path based on the current temperature of the wireless communication terminal 400. For instance, the second processor 420 (e.g., the heat generation control unit 421) may change at least one first transmission path used for transmission to the base station into at least one second transmission path based on detecting an overheating state. The second processor 420 (e.g., the heat generation control unit 421) may detect that the wireless communication terminal 400 is in the overheating state when the temperature of the wireless communication terminal 400 satisfies (e.g., is equal to or greater than) a threshold, and the second processor 420 (e.g., the heat generation control unit 421) may detect that the wireless communication terminal 400 is not in the overheating state when the temperature of the wireless communication terminal 400 fails to satisfy (e.g., is less than) a threshold.

In some embodiments, the heat generation control unit 421 may randomly select the at least one second transmission path. In some embodiments, the heat generation control unit 421 may select at least one second transmission path based on a round-robin. Selecting a transmission path based on a round-robin may refer to selecting a transmission path based on an order for selecting transmission paths (e.g., selecting a next transmission path in the order). In some embodiments, when the current temperature of the wireless communication terminal 400 is higher than the threshold temperature, the heat generation control unit 421 may select at least one second transmission path. In some embodiments, the heat generation control unit 421 may select at least one second transmission path based on the arrangement of the plurality of antennas 430. In some embodiments, the first transmission path or the second transmission path may provide beamforming or multiple-input multiple-output (MIMO) using the plurality of antennas.

The method of changing to the second transmission path may actively change a transmission path while delaying a time at which a heat generation and power consumption exceeds a threshold. Accordingly, the heat generated at the wireless communication terminal may be unlikely to exceed or may not exceed the threshold. In some examples, in a method in which the heat generation control unit 421 changes at least one first transmission path used for transmitting to the base station into at least one second transmission path based on the current temperature of the wireless communication terminal 400, a time for the temperature of the wireless communication terminal 400 to reach a threshold temperature may be longer than a time for the temperature of the wireless communication terminal 400 to reach a critical temperature in a method of changing to at least one second transmission path after detecting heat generation.

In FIG. 4, the wireless communication terminal 400 is illustrated as including the first processor 410, the second processor 420, and the plurality of antennas 430. In some examples, the wireless communication terminal 400 may further include an additional configuration (e.g., additional components) in addition to the configuration described with reference to FIG. 4.

Figure 5:
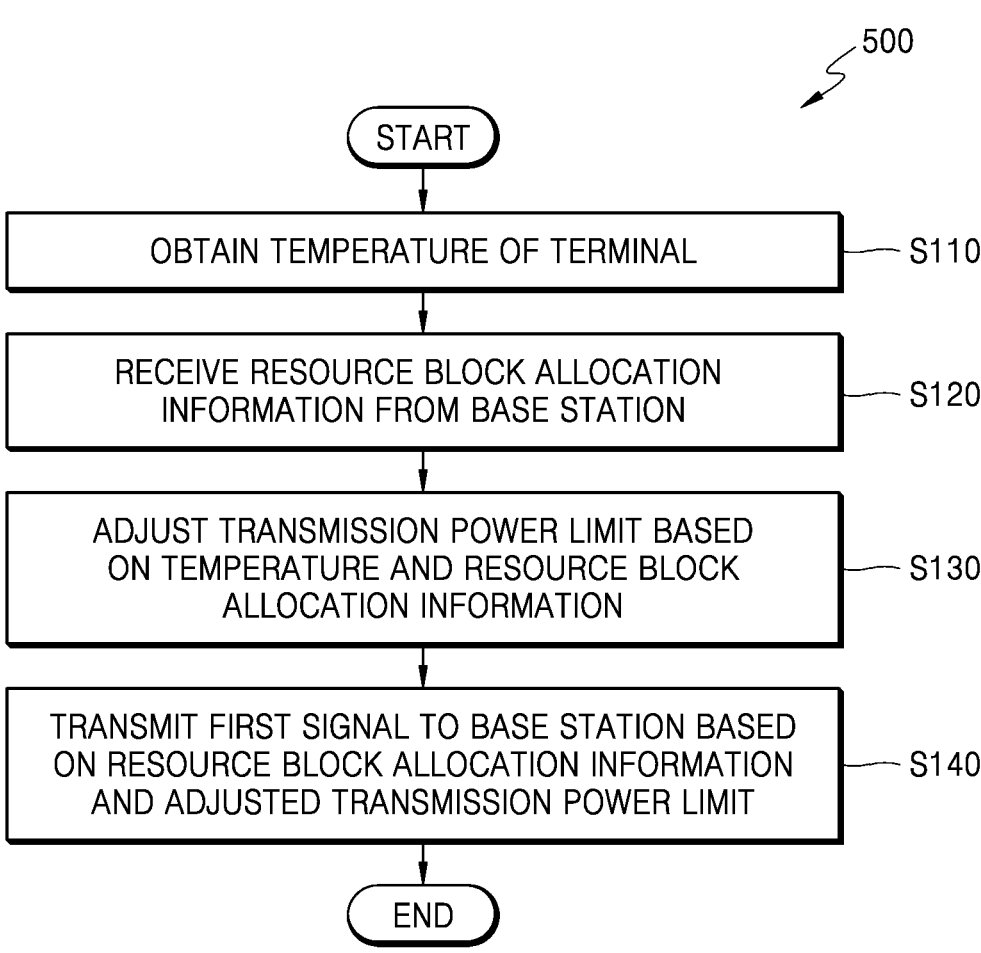
FIG. 5 is a flowchart illustrating a method of adjusting a transmission power limit according to one or more aspects of the present disclosure.

FIG. 5 is a flowchart illustrating a method of adjusting a transmission power limit according to one or more aspects of the present disclosure. As illustrated in FIG. 5, the method 500 of adjusting the transmission power limit may include a plurality of operations S110 to S140.

In some examples, adjusting a transmission power limit may refer to changing (e.g., reducing) the transmission power limit. The transmission power limit may be a first transmission power limit, and the adjusted transmission power limit may be a second transmission power limit. For instance, the first transmission power limit may be adjusted to the second transmission power limit (e.g., where the second transmission power limit is lower than the first transmission power limit). The second transmission power limit may be calculated based on a back-off from the first transmission power limit. For instance, the second transmission power limit may be calculated by subtracting the back-off from the first transmission power limit. Thus, adjusting a transmission power limit may refer to backing off from the transmission power limit, adjusting a back-off from the transmission power limit, or calculating a back-off from the transmission power limit. A terminal or other device may transmit one or more signals in accordance with an adjusted transmission power limit by transmitting the one or more signals using a transmit power that is equal to or less than the adjusted transmission power limit.

In FIG. 5, the temperature of the terminal may be obtained in operation S110. In an embodiment, the temperature sensor 411 of FIG. 4 may measure a temperature of the wireless communication terminal 400, and the heat generation detection unit 412 may compare the measured temperature with a threshold temperature to determine whether heat is generated (e.g., whether a threshold amount of heat is generated). The heat generation detection unit 412 may transmit an indication of whether or not heat is generated and an indication of the measured temperature to the heat generation control unit 421.

In operation S120, resource block allocation information may be received from the base station. In an embodiment, the first base station BS1 of FIG. 1 may generate mapping information for an uplink resource for the first UE UE1 to use to transmit a first uplink signal (e.g., uplink control information, uplink data, etc.) to the first base station BS1. In some examples, the first base station BS1 may provide the information to the first UE UE1 via the control channel. Thereafter, the first UE UE1 may transmit, to the first base station BS1, the first uplink signal based on uplink scheduling.

In operation S130, the transmission power limit may be adjusted based on the temperature information and the resource block allocation information. For example, the heat generation control unit 421 of FIG. 4 may adjust a transmission power limit for uplink transmission based on the temperature obtained in operation S110 and the resource block allocation information received in operation S120. Details of operation S130 will be described later with reference to FIG. 6.

In operation S140, the first signal may be transmitted to the base station based on the resource block allocation information and the adjusted transmission power limit. In an embodiment, the wireless communication terminal 400 of FIG. 4 may adjust the transmission power based on the transmission power limit adjusted in operation S130, and the wireless communication terminal 400 may transmit the uplink signal to the base station (e.g., BS1 of FIG. 1) based on the adjusted transmission power and the resource block allocation information.

Figure 6:
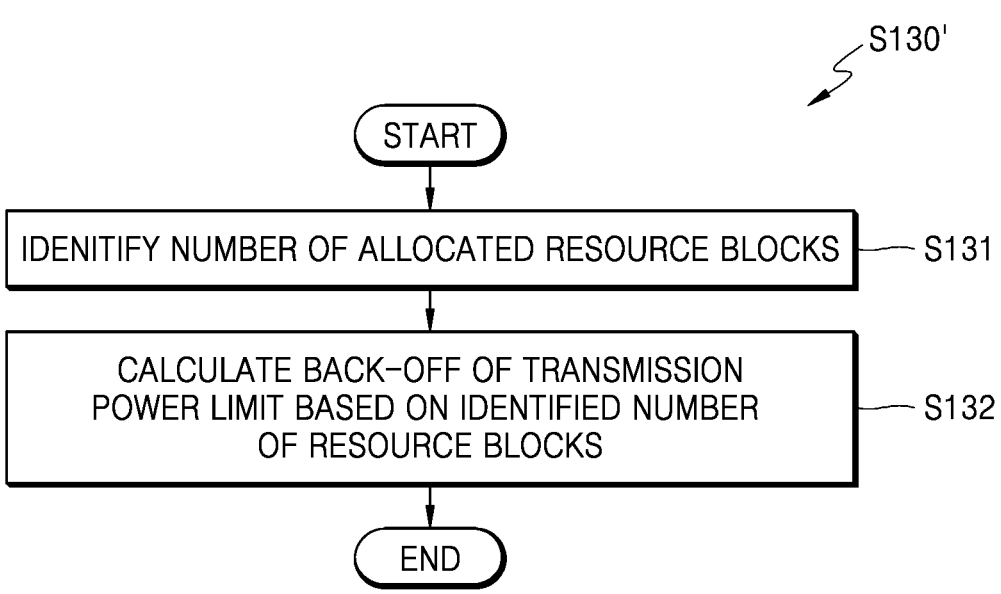
FIG. 6 is a flowchart illustrating a method of adjusting a transmission power limit according to one or more aspects of the present disclosure.

FIG. 6 is a flowchart illustrating a method of adjusting a transmission power limit according to one or more aspects of the present disclosure. For example, the flowchart of FIG. 6 shows an example (S130') of operation S130 of FIG. 5. As shown in FIG. 6, the method of adjusting the transmission power limit S130' may include operations S131 and S132.

In operation S131, the number of allocated resource blocks may be identified based on resource block allocation information. For example, the heat generation control unit 421 of FIG. 4 may identify the number of resource blocks allocated to the wireless communication terminal 400 for uplink transmission based on the resource block allocation information provided from the base station.

In operation S132, a back-off from the transmission power limit may be calculated based on the number of resource blocks identified in operation S131. For example, the heat generation control unit 421 of FIG. 4 may calculate a back-off from the transmission power limit based on the number of resource blocks identified in operation S131. As described with reference to FIG. 3, when the number of allocated resource blocks is relatively small, the strength of a transmission power allocated per carrier may be increased, and thus, the back-off from the transmission power limit may be increased. In some embodiments, when the number of allocated resource blocks is relatively large, the strength of the transmission power allocated per carrier may be small, and thus the back-off from the transmission power limit may be calculated to be small. Since back-off is adaptively calculated according to the number of resource blocks, power consumption and heat generation of the terminal may be reduced without degrading the performance of the terminal. Examples of operation S132 will be described later with reference to FIGS. 7A to 7C.

Figure 7A:
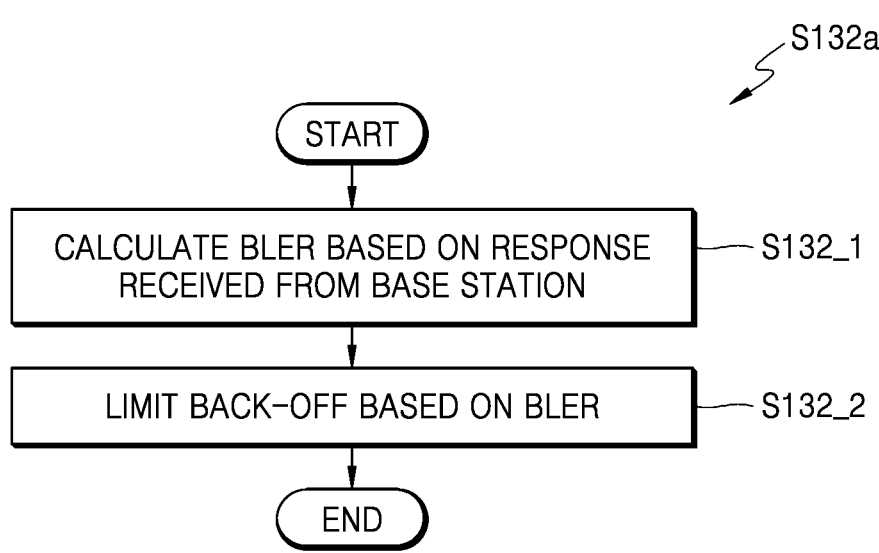
FIGS. 7A to 7C are flowcharts illustrating examples of a method of calculating a back-off according to one or more aspects of the present disclosure.
Figure 7B:
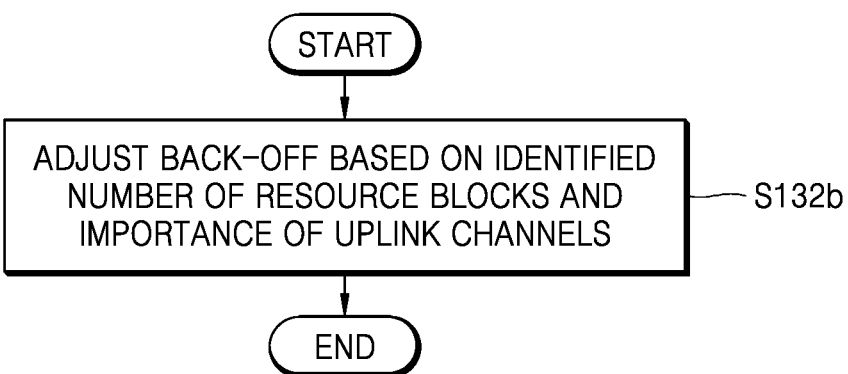
Figure 7C:
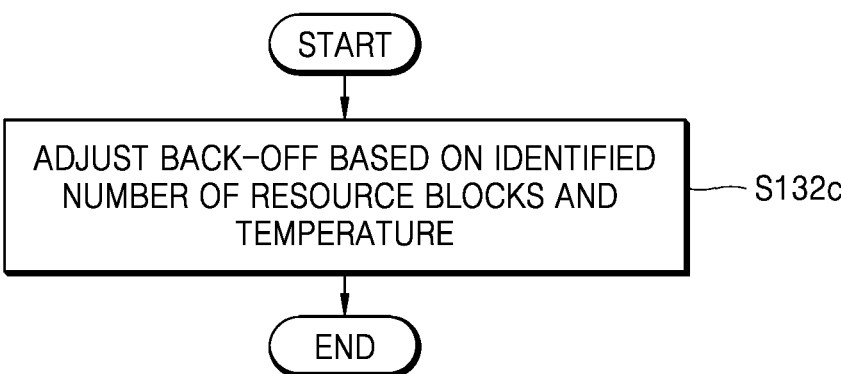

FIGS. 7A to 7C are flowcharts illustrating examples of a method of calculating a back-off according to one or more aspects of the present disclosure. For example, the flowcharts of FIGS. 7A to 7C show examples S132*a*, S132*b*, S132*c* of operation S132 of FIG. 6, respectively. In some embodiments, operation S132 of FIG. 6 may include at least one of operations S132*a*, S132*b*, and S132*c* of FIGS. 7A to 7C.

In FIG. 7A, a method of calculating a back-off from a transmission power limit S132*a* may include operations S132_1 and S132_2.

In operation S132_1, the block error rate BLER may be calculated based on the response received from the base station. For example, the heat generation control unit 421 of FIG. 4 may calculate the BLER based on a response provided by the base station to the wireless communication terminal 400 in response to the uplink signal. In some embodiments, the method 500 of FIG. 5 may be repeated and the response used to compute the BLER may be a response to the first signal transmitted to the base station in operation S140. The BLER may be calculated in any manner. For example, the BLER may be calculated using Equation 2.

$$BLER = \text{Number of error blocks/number of total blocks received} \qquad \text{Equation 2}$$

In operation S132_2, a back-off may be limited based on the BLER. Limiting a back-off may refer to setting a maximum value for the back-off. In an embodiment, the first UE UE1 of FIG. 1 may transmit a first signal to the first base station BS1 on at least one resource block, and the first base station BS1 may transmit an acknowledgment (ACK) or a negative acknowledgment (NACK) to the first UE UE1. The first UE UE1 may calculate the BLER based on the ACK or NACK. The first UE UE1 may include the heat generation control unit 421 of FIG. 4, and the heat generation control unit 421 may determine that the back-off is excessively high when the BLER is greater than or equal to a predefined threshold value. If the heat generation control unit 421 determines that the back-off is excessively high, the heat generation control unit 421 may increase the maximum transmission power by reducing back-off. In some embodiments, the heat generation control unit 421 may compare the BLER with a plurality of thresholds and may determine a reduction amount for a back-off according to a range that includes the BLER.

In FIG. 7B, a back-off may be adjusted based on the number of identified resource blocks and the importance (e.g., priority) of uplink channels in operation S132b. For example, data channels (e.g. PUSCH) may be more important than (e.g., have a higher priority than) control channels (e.g. PUCCH) which may be more important than (e.g., have a higher priority than) reference signal channels (e.g., sounding reference signal (SRS) channels). Accordingly, the heat generation control unit 421 may relatively reduce back-off for transmitting on a data channel, while the back-off may be relatively increased for transmitting on a reference signal channel.

Referring to FIG. 7C, a back-off may be adjusted based on the number of identified resource blocks and temperature in operation S132c. For example, when the temperature of the wireless communication terminal 400 is equal to or greater than a predetermined first threshold value, the heat generation control unit 421 of FIG. 4 may increase back-off to lower transmission power. In addition, when the temperature of the wireless communication terminal 400 is less than a predetermined second threshold, the heat generation control unit 421 may reduce back-off because there may be a margin in transmission power.

Figure 8:
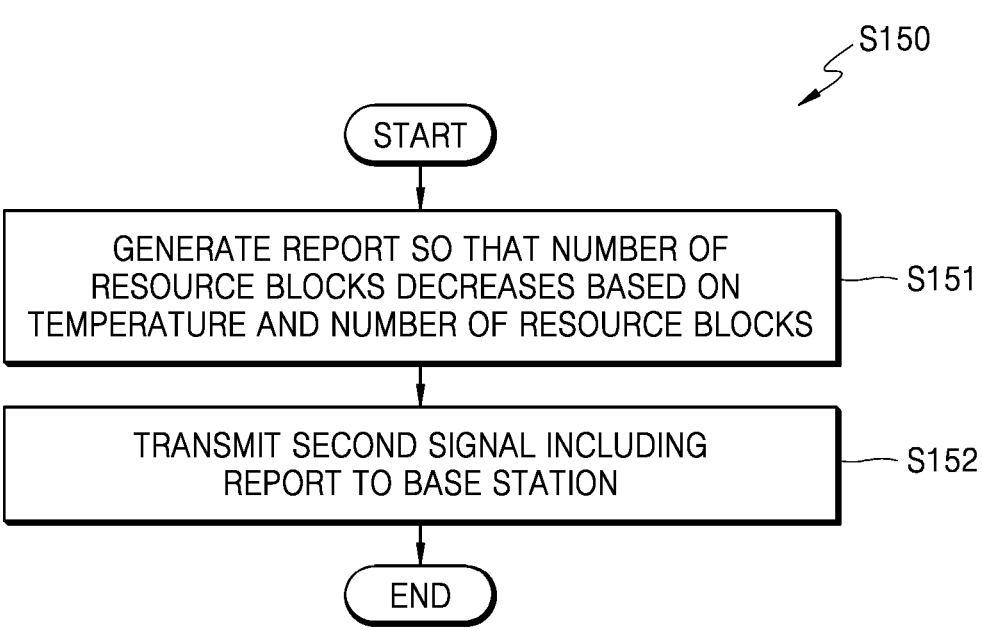
FIG. 8 is a flowchart illustrating a method of adjusting a transmission power limit according to one or more aspects of the present disclosure.

FIG. 8 is a flowchart illustrating a method of adjusting a transmission power limit according to one or more aspects of the present disclosure. As shown in FIG. 8, the method S150 of adjusting the transmission power limit may include operations S151 and S152. In some embodiments, the method S150 of adjusting the transmission power limit of FIG. 8 may be performed following operation S140 of FIG. 5.

Referring to FIG. 8, in operation S151, a report may be generated such that a number of allocated resource blocks decreases based on the temperature and a number of previously allocated resource blocks. In an embodiment, the transmission power of the wireless communication terminal 400 may be calculated using Equation 3.

$$P_{PUSCH,b,f,c}(i, j, q_d, l) =$$

$$\min \left\{ \begin{array}{l} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array} \right\}$$

<div align="right">Equation 3</div>

In Equation 3, $M_{RB,b,f,c}^{PUSCH}(i)$ may be a PUSCH resource allocated in a subframe i and may be the number of resource blocks. Accordingly, the transmission power of the wireless communication terminal 400 may increase as the number of resource blocks increases, and the transmission power of the wireless communication terminal 400 may decrease as the number of resource blocks decreases. In an embodiment, the transmission power of the wireless communication terminal 400 may be calculated using Equation 4.

$$P_{PUCCH,b,f,c}(i, q_u, q_d, l) =$$

$$\min \left\{ \begin{array}{l} P_{CMAX,f,c}(i), \\ P_{O\_PUCCH,b,f,c}(q_u) + 10\log_{10}\left(2^{\mu} \cdot M_{RB,b,f,c}^{PUCCH}(i)\right) + \\ PL_{b,f,c}(q_d) + \Delta_{F\_PUCCH}(F) + \Delta_{TF,b,f,c}(i) + g_{b,f,c}(i, l) \end{array} \right\}$$

<div align="right">Equation 4</div>

In Equation 4, M (i) is a PUSCH resource allocated in a subframe i and may be the number of resource blocks. Accordingly, the transmission power of the wireless communication terminal 400 may increase as the number of resource blocks increases, and the transmission power of the wireless communication terminal 400 may decrease as the number of resource blocks decreases. Details of the report will be described later with reference to FIGS. 9 and 10.

In operation S152, the first signal including the report may be transmitted to the base station. In an embodiment, the first UE UE1 of FIG. 1 may communicate with the first base station BS1, and the first UE UE1 may transmit a first signal including a report to the first base station BS1 on at least one resource block.

Figure 9:
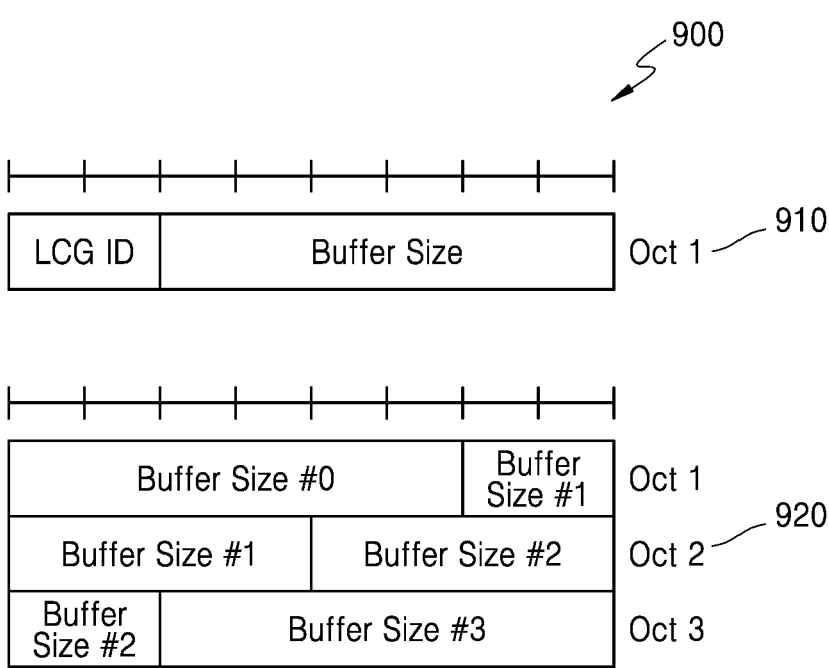
FIG. 9 illustrates data formats of a Short buffer status report (BSR) and a Long BSR according to one or more aspects of the present disclosure.
Figure 10:
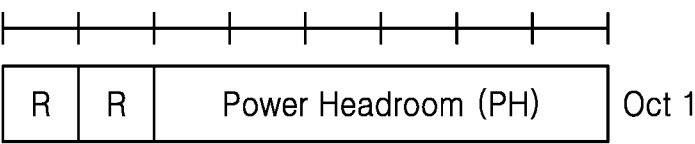
FIG. 10 illustrates a medium access control (MAC) control element (MAC-CE) format of Long Term Evolution (LTE) for a power headroom information transmission according to one or more aspects of the present disclosure.

FIG. 9 illustrates data formats of a Short buffer status report (BSR) and a Long BSR according to one or more aspects of the present disclosure. FIG. 10 illustrates a medium access control (MAC) control element (MAC-CE) format of LTE for power headroom information transmission according to one or more aspects of the present disclosure.

In an example of FIG. 9, in operation S151 of FIG. 8, the report may be a BSR 900. The BSR may be used by the terminal to inform the base station of a buffer status at the terminal. The buffer status at the terminal may indicate an amount of data available for transmission from the terminal to the base station. In some examples, the heat generation control unit 421 of FIG. 4 may provide the base station with a BSR indicating that the buffer status is not sufficient to induce the base station to allocate the reduced resource blocks. Meanwhile, the heat generation control unit 421 of FIG. 5 may provide the base station with a BSR indicating a current buffer status when a margin is sufficient in the transmission power.

For instance, the heat generation control unit 421 may determine that a first amount of data is available for transmission by the terminal, but the heat generation control unit 421 may indicate (e.g., report) that a second amount of data is available for transmission by the terminal based on a temperature at the terminal. In some examples, when the temperature at the terminal increases or is greater than a temperature threshold, the second amount of data indicated as available for transmission may be less than the first amount of data that is actually available for transmission such that the base station may allocate a reduced number of (e.g., less) resource blocks to the terminal. Accordingly, the terminal may transmit on the reduced number of resources to control the temperature at the terminal. Alternatively, when the temperature at the terminal decreases or is less than a temperature threshold, the second amount of data indicated as available for transmission may be close to or equal to the first amount of data that is actually available for transmission such that the base station may allocate an appropriate number of resource blocks to the terminal. Accordingly, the terminal may transmit on the resource blocks without any constraints due to a temperature increase.

In some embodiments, the BSR may have a data format of a short BSR 910 or a long BSR 920. The LCG ID of the short BSR 910 corresponds to a logical channel group identifier. The terminal may group up to four logical channels into one LCG and report a buffer status for each LCG. Through such grouping, it may be possible to reduce overhead when a BSR is made for each logical channel. The method of grouping the logical channels may be informed by the base station to the terminal. The long BSR 920 may include four buffer size fields corresponding to each of the LCG IDs #0 to #3. Each buffer size field may include sizes of all data waiting to be transmitted in the radio link control (RLC) layer and the packet data convergence protocol (PDCP) layer included in the corresponding LCG. In some embodiments, when the temperature of the terminal is greater than or equal to a threshold temperature, a BSR may be set as a value indicating that the buffer is insufficient.

In an example of FIG. 10, in operation S151 of FIG. 8, the report may be a power headroom report. In LTE, the terminal may transmit power headroom information (e.g., an indication of a power headroom) to the base station through an uplink. In this case, the power headroom value refers to a difference between the maximum transmission power of the terminal and the transmission power actually used by the terminal for uplink transmission. The base station may perform a method for optimizing system performance by using power headroom information received from the terminal.

For example, when the power headroom information received from the terminal is positive (e.g., a transmission power margin is large or greater than a threshold), the base station may determine that the corresponding terminal may increase an uplink transmission power. Thus, the base station may increase the amount of resources allocated to the terminal during scheduling of the corresponding terminal. Conversely, when the power headroom information received from the terminal is negative (e.g., a transmission power margin is small or less than a threshold), the base station may determine that the corresponding terminal may decrease an uplink transmission power. Thus, the base station may decrease the amount of resources allocated to the terminal during scheduling of the corresponding terminal.

Using the techniques described herein, it may be possible to secure coverage of data transmitted on the uplink and reduce power consumption of the terminal. The heat generation control unit 421 of FIG. 4 may reduce the power headroom in order to induce the base station to allocate the reduced resource blocks. The operations including transmitting and receiving power headroom information of the base station and the terminal may be applied in the 5G communication system, and power headroom information may be provided using the format illustrated in FIG. 10. R may correspond to a reserved bit and may be set to '0', and the power headroom information may be expressed in 6 bits and may have an interval of 1 dB from −23 dB to 40 dB. In some embodiments, when the temperature of the terminal is greater than or equal to a threshold temperature, a power headroom report may be set to a value indicating that the power headroom is insufficient.

For instance, the heat generation control unit 421 may determine a first power headroom available for increasing a transmission power based on transmissions by the terminal, but the heat generation control unit 421 may indicate (e.g., report) a second power headroom based on a temperature at the terminal. In some examples, when the temperature at the terminal increases or is greater than a temperature threshold, the second power headroom that is reported may be less than the first power headroom such that the base station may allocate a reduced number of (e.g., less) resource blocks to the terminal. Accordingly, the terminal may transmit on the reduced number of resources to control the temperature at the terminal. Alternatively, when the temperature at the terminal decreases or is less than a temperature threshold, the second power headroom that is reported may be close to or equal to the first power headroom such that the base station may allocate an appropriate number of resource blocks to the terminal. Accordingly, the terminal may transmit on the resource blocks without any constraints due to a temperature increase.

Figure 11:
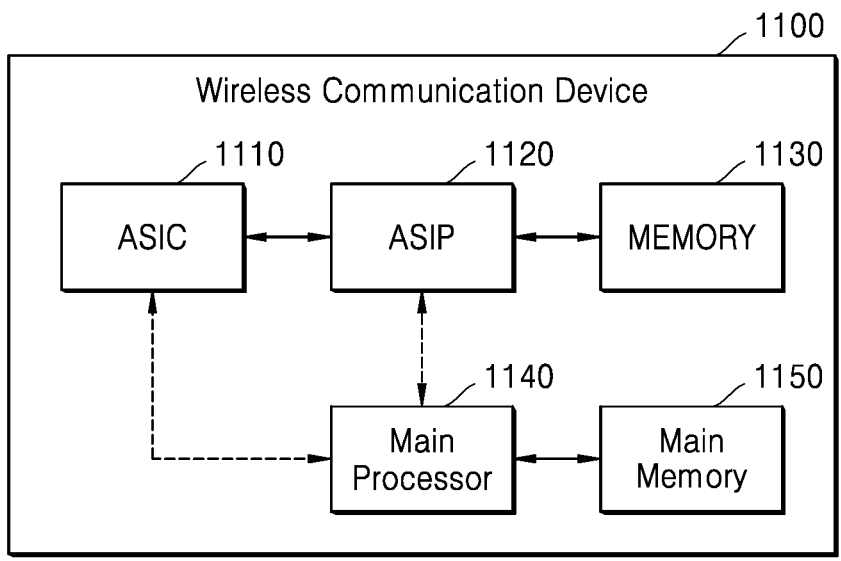
FIG. 11 is a block diagram schematically illustrating configurations of a wireless communication device according to one or more aspects of the present disclosure.

FIG. 11 is a block diagram schematically illustrating configurations of a wireless communication device according to one or more aspects of the present disclosure.

In FIG. 11, the wireless communication device 1100 may include an application specific integrated circuit (ASIC) 1110, an application specific instruction set processor (ASIP) 1120, a memory 1130, a main processor 1140, and a main memory 1150. Two or more of the ASIC 1110, the ASIP 1120, and the main processor 1140 may communicate with each other. In addition, at least two or more of the ASIC 1110, the ASIP 1120, the memory 1130, the main processor 1140, and the main memory 1150 may be embedded in one chip.

The ASIP 1120 may be a customized integrated circuit for a specific purpose and may support a dedicated instruction set for a specific application and execute instructions included in the instruction set. The memory 1130 may communicate with the ASIP 1120 and may store a plurality of instructions executed by the ASIP 1120 on a non-transitory storage device. For example, the memory 1130 may include, as non-limiting examples, any type of memory accessible by the ASIP 1120, as in random access memory (RAM), read only memory (ROM), tape, magnetic disk, optical disk, volatile memory, non-volatile memory, and combinations thereof.

The main processor 1140 may control the wireless communication device 1100 by executing a plurality of instructions. For example, the main processor 1140 may control the ASIC 1110 and the ASIP 1120, process data received through a wireless communication network, or process a user input to the wireless communication device 1100. The main memory 1150 may communicate with the main processor 1140 and may store a plurality of instructions executed by the main processor 1140 on a non-transitory storage device. For example, the memory 1150 may include, as non-limiting examples, any type of memory accessible by the main memory 1140, as in random access memory (RAM), read only memory (ROM), tape, magnetic disk, optical disk, volatile memory, non-volatile memory, and combinations thereof.

A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In some aspects, a wireless communication device may include a transceiver to perform, or aid in, various wireless communications operations described herein. For example, A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by the modem.

The above-described wireless communication systems, devices, methods, or techniques according to one or more aspects of the present disclosure may be performed by at least one of the components included in the wireless communication device 1100. In some embodiments, at least one of the operations of the wireless communication method and the second processor 420 of FIG. 4 may be implemented as a plurality of instructions stored in the memory 1130. The ASIP 1120 may perform at least one of the operations of the wireless communication method and at least some of the operations of the second processor 420 of FIG. 4, by executing the plurality of instructions stored in the memory 1130. In some embodiments, at least one of the operations of the wireless communication method and the second processor 420 of FIG. 4 may be implemented as a hardware block designed through logic synthesis, etc, and may be included in the ASIC 1110. In some embodiments, at least one of the operations of the wireless communication method and the first processor 410 of FIG. 4, may be implemented as a plurality of instructions stored in the main memory 1150, and The main processor 1140 may perform at least one of the operations of the wireless communication method and at least some of the operations of the first processor 410 of FIG. 4, by executing the plurality of instructions stored in the main memory 1150.

Figure 12:
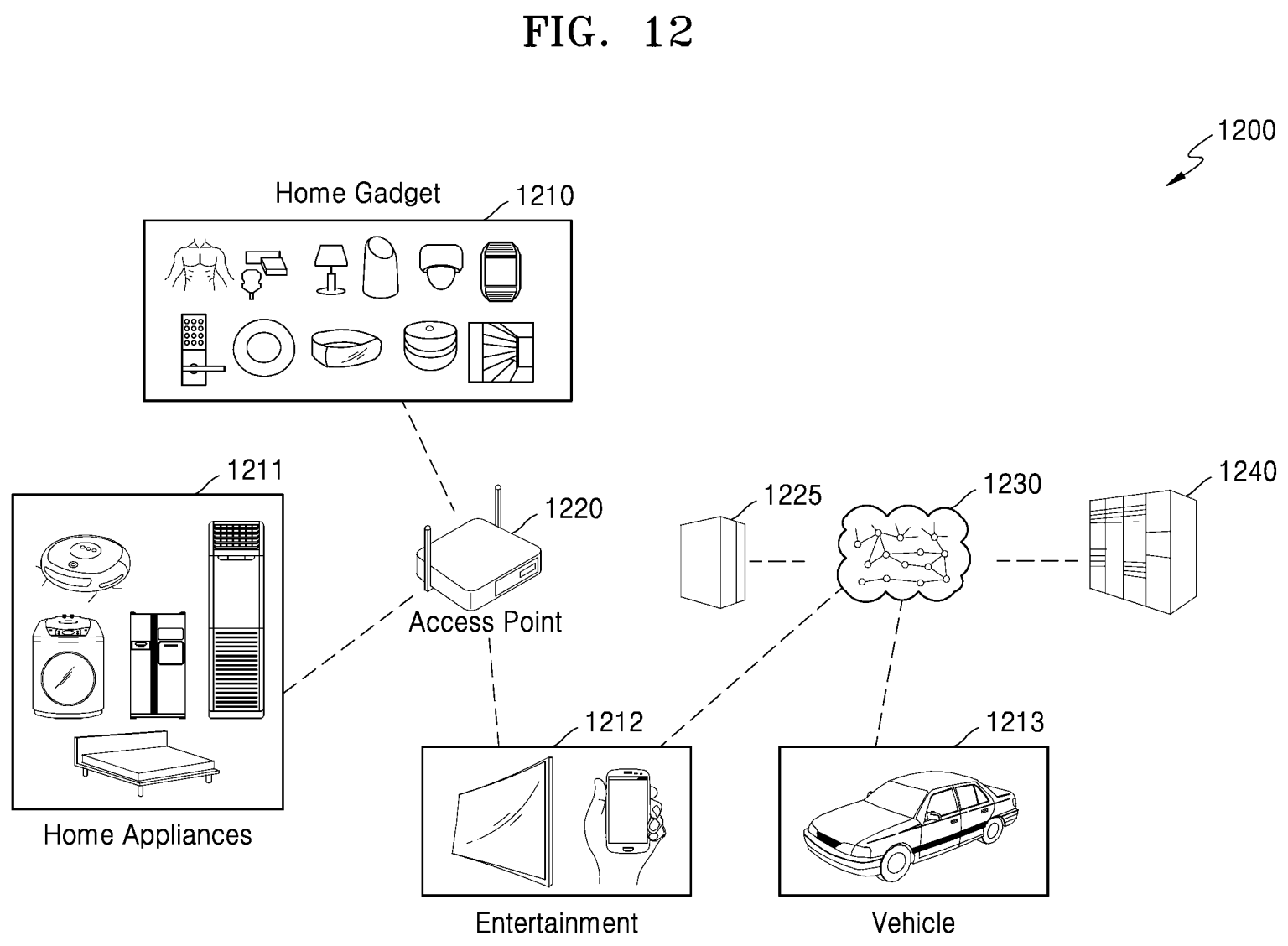

FIG. 12 is a conceptual diagram illustrating an internet of things (IoT) network system applied to one or more aspects of the present disclosure.

Referring to FIG. 12, the IoT network system 1200 may include a plurality of IoT devices 1210, 1211, 1212, and 1213, an access point 1220, a gateway 1225, a wireless network 1230, and a server 1240. IoT may refer to a network between objects using wired/wireless communication.

Each of the IoT devices 1210, 1211, 1212, and 1213 may form a group according to a characteristic of each IoT device. For example, IoT devices may be grouped into a home gadget group 1210, a home appliance/furniture group 1211, an entertainment group 1212, or a vehicle group 1213. A plurality of IoT devices 1210, 1211 and 1212 may be connected to a communication network or connected to other IoT devices through the access point 1220. The access point 1220 may be embedded in one IoT device. The gateway 1225 may change the protocol to connect the access point 1220 to an external wireless network. The IoT devices 1210, 1211, and 1212 may be connected to an external communication network through the gateway 1225. The wireless network 1230 may include an Internet and/or a public network. The plurality of IoT devices 1210, 1211, 1212, and 1213 may be connected to a server 1240 that provides a predetermined service through the wireless network 1230, and a user may use the service through at least one of the plurality of IoT devices 1210, 1211, 1212, and 1213. Each of the plurality of IoT devices 1210, 1211, 1212, and 1213 may select at least one of the first to third control schemes according to the embodiments of the inventive concept, and thus heat generation and power consumption may be actively controlled in the plurality of IoT devices.

While one or more aspects of the present disclosure have been particularly shown and described with reference to embodiments thereof, it will be understood that various changes in form and details may be made therein (e.g., by analogy) without departing from the spirit and scope of the following claims.

What is claimed is:

1. A method of wireless communication by a terminal, the method comprising:
   obtaining a temperature of the terminal;
   receiving resource block allocation information from a base station;
   adjusting a transmission power limit based at least in part on the temperature and the resource block allocation information; and
   transmitting a first signal to the base station on at least one resource block based at least in part on the resource block allocation information and the adjusted transmission power limit,
   wherein adjusting the transmission power limit comprises:
   identifying a number of allocated resource blocks based at least in part on the resource block allocation information;
   calculating a back-off from the transmission power limit based at least in part on the identified number of the resource blocks;
   calculating a block error rate (BLER) based at least in part on a response from the base station to the first signal; and
   limiting the back-off based at least in part on the BLER.

2. The method of claim 1, wherein adjusting the transmission power limit further comprises adjusting the back-off based on an importance of uplink channels.

3. The method of claim 2, wherein adjusting the back-off comprises:
   reducing the back-off for transmitting the first signal on a data channel; or
   increasing the back-off for transmitting the first signal on a reference signal channel.

4. The method of claim 1, wherein adjusting the transmission power limit further comprises adjusting the back-off based at least in part on the temperature.

5. The method of claim 1, further comprising:

identifying a first number of allocated resource blocks based at least in part on the resource block allocation information;

generating a report based at least in part on the temperature and the first number of allocated resource blocks; and transmitting a second signal including the report to the base station.

6. A method of wireless communication by a terminal, the method comprising:

obtaining a temperature of the terminal;

identifying a first number of resource blocks allocated by a base station;

generating a report based at least in part on the temperature and the first number of allocated resource blocks;

transmitting a first signal including the report to the base station;

receiving, based at least in part on the report, resource block allocation information from the base station allocating a second number of resource blocks to the terminal, wherein the second number of allocated resource blocks is less than the first number of allocated resource blocks based at least in part on the report; and adjusting a transmission power limit based at least in part on the temperature and the second number of allocated resource blocks, wherein adjusting the transmission power limit comprises:

calculating a back-off from the transmission power limit based at least in part on the second number of allocated resource blocks;

calculating a block error rate (BLER) based at least in part on a response from the base station to the first signal; and limiting the back-off based at least in part on the BLER.

7. The method of claim 6, wherein the report is a buffer status report.

8. The method of claim 7, wherein generating the report comprises setting, based at least in part on the temperature being greater than or equal to a threshold value, the buffer status report to a value indicating that an amount of data available for transmission is below a threshold.

9. The method of claim 6, wherein the report is a power headroom report.

10. The method of claim 9, wherein generating the report comprises setting, based at least in part on the temperature being greater than or equal to a threshold value, the power headroom report to a value indicating that a power headroom is below a threshold.

11. The method of claim 6, further comprising:

transmitting a second signal to the base station based on the adjusted transmission power limit.

* * * * *